US012684308B2

(12) United States Patent
Kim

(10) Patent No.: US 12,684,308 B2
(45) Date of Patent: Jul. 14, 2026

(54) CROSSTALK CANCELLATION FOR REVERBERANT ACOUSTIC FIELDS

(71) Applicant: HARMAN INTERNATIONAL INDUSTRIES, INCORPORATED, Stamford, CT (US)

(72) Inventor: Jeong-Woo Kim, Porter Ranch, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 299 days.

(21) Appl. No.: 18/447,201

(22) Filed: Aug. 9, 2023

(65) Prior Publication Data

US 2025/0056182 A1 Feb. 13, 2025

(51) Int. Cl.

*H04S 7/00* (2006.01)
*G10K 11/178* (2006.01)
*G10L 19/26* (2013.01)
*G10L 21/0208* (2013.01)
*G10L 21/0232* (2013.01)
*H04R 1/10* (2026.01)
*H04R 3/12* (2006.01)

(52) U.S. Cl.

CPC .............. *H04S 7/305* (2013.01); *H04S 7/303* (2013.01)

(58) Field of Classification Search

None

See application file for complete search history.

(56) References Cited

U.S. PATENT DOCUMENTS 6,449,368 B1 * 9/2002 Davis ...................... H04S 1/002 381/1
2015/0289059 A1 10/2015 Christoph
2016/0196818 A1 * 7/2016 Christoph ................ H04K 3/43 381/71.6
2018/0122355 A1 * 5/2018 Oswald ............ G10K 11/17853

(Continued)

FOREIGN PATENT DOCUMENTS

WO WO-2014036121 A1 * 3/2014 ............... H04S 7/30

OTHER PUBLICATIONS

Prinn, Albert G., "A Review of Finite Element Methods for Room Acoustics", vol. 5, No. 2, https://doi.org/10.3390/acoustics5020022, Apr. 4, 2023, pp. 367-395.

(Continued)

*Primary Examiner* — Qin Zhu

(74) *Attorney, Agent, or Firm* — Artegis Law Group, LLP

(57) ABSTRACT

A computer-implemented method for generating crosstalk cancellation (CTC) filters for a reverberant acoustic environment having multiple audio zones, the method comprising determining, based on a CTC simulation model of an acoustic environment, a first set of frequency responses for respective positions proximate to one or more speakers located in the acoustic environment, and a second set of frequency responses for respective listening positions in the acoustic environment, generating, based on the first set of frequency responses and the second set of frequency responses, an acoustic environment transfer function matrix for the acoustic environment, and generating, based on the acoustic environment transfer function matrix, a set of CTC filters for a set of speakers in the acoustic environment.

18 Claims, 5 Drawing Sheets

(56) References Cited

U.S. PATENT DOCUMENTS

| | | | | |
|---|---|---|---|---|
| 2019/0246231 | A1 * | 8/2019 | Wardle | H04S 7/304 |
| 2021/0204085 | A1 | 7/2021 | Claar | |

OTHER PUBLICATIONS

Jensen, Mads Herring, “Modeling Room Acoustics with COMSOL Multiphysics”, retrieved from https://www.comsol.com/blogs/modeli ng-room-acoustics-with-comsolmulti physics, Feb. 25, 2015, pp. 1-6.

* cited by examiner

CROSSTALK CANCELLATION FOR REVERBERANT ACOUSTIC FIELDS

BACKGROUND

Field of the Various Embodiments

The various embodiments relate generally to audio output devices and, more specifically, to crosstalk cancellation for reverberant acoustic fields.

Description of the Related Art

Audio processing systems use one or more speakers to produce sound in a given space. The one or more speakers generate a sound field, where a user in the environment receives the sound included in the sound field. Various audio processing systems perform audio processing and reproduction techniques to reproduce sound fields for distinct sound zones, where the listener in a given sound zone only hears the audio intended for that sound zone. To generate a sound field for a sound zone, an audio processing system uses one or more filters to generate the sounds that create the sound field. For example, the audio processing system estimates impulse responses in the time domain at various locations within the sound field and adjusts the audio output based on the respective impulse responses. Such filters also include various noise cancellation filters to attenuate the sounds produced for other sound fields, enabling multiple listeners to listen to distinct audio without requiring changes to the environment to block sound fields intended for other sound zones.

One such technique to enable the generation of multiple sound zones is crosstalk cancellation (CTC), where a CTC filter is applied to an input audio signal for a first sound field to generate a cancelling version of the input audio signal to significantly reduce the audibility of sound associated with the input audio signal within a second sound zone. Frequency responses are measured in the acoustic environment to determine the transfer functions for the applicable sound fields, which are used to generate the CTC filters. When combined, the cancellation signals produced by the CTC filters cancel specific sounds and enable a listener to listen to specific audio within the second sound zone without requiring specialized equipment, such as noise cancellation headphones.

One drawback with conventional audio processing systems is that such systems do not accurately model the acoustic environment. For example, in order to provide audio in a given acoustic environment, the audio system needs to tailor various parameters to account for characteristics of the acoustic environment. However, conventional models used to represent the acoustic environment do not accurately reflect the characteristics of the acoustic environment and output devices within the acoustic environment. As a result, the conventional models provide an inaccurate transfer function representing the sound fields and thus generate errors in the estimated transfer functions, which results in inaccurate CTC filters. This results in distortion in such acoustic environments and a degraded auditory experience for the user. In other instances, designers are forced to acquire measurement data for each acoustic environment to accurately measure frequency responses at specific locations and determine an accurate transfer function. However, such methods are time-consuming and expensive, requiring designers to acquire distinct measurement data for each acoustic environment and various configurations of listeners within the acoustic environment.

As the foregoing illustrates, what is needed in the art are more effective techniques for generating crosstalk cancellation filters.

SUMMARY

In various embodiments, a computer-implemented method for generating crosstalk cancellation (CTC) filters for a reverberant acoustic environment having multiple audio zones comprises determining, based on a CTC simulation model of an acoustic environment, a first set of frequency responses for respective positions proximate to one or more speakers located in the acoustic environment, and a second set of frequency responses for respective listening positions in the acoustic environment, generating, based on the first set of frequency responses and the second set of frequency responses, an acoustic environment transfer function matrix for the acoustic environment, and generating, based on the acoustic environment transfer function matrix, a set of CTC filters for a set of speakers in the acoustic environment.

Further embodiments provide, among other things, non-transitory computer-readable storage media storing instructions for implementing the method set forth above, as well as a system configured to implement the method set forth above.

At least one technical advantage of the disclosed techniques relative to the prior art is that, with the disclosed techniques, an audio processing system can more accurately generate multiple sound fields in an acoustic environment with lower distortion, increasing the auditory experience of the listener within the sound zone. In particular, by implementing a CTC simulation model that includes a distinct acoustic domain model, the audio processing system determines more accurate transfer functions of the acoustic environment from the location of the output devices to the locations of listeners. As a result, the audio processing system generates more accurate estimates of frequency responses within the acoustic environment and more accurate CTC filters to lower distortion associated with other sound zones, increasing the auditory experience of a user within the sound zone. Further, the disclosed techniques reduce the time spent collecting measurements of impulse responses in the time domain at locations within a listening environment that are otherwise needed to generate an accurate sound field. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
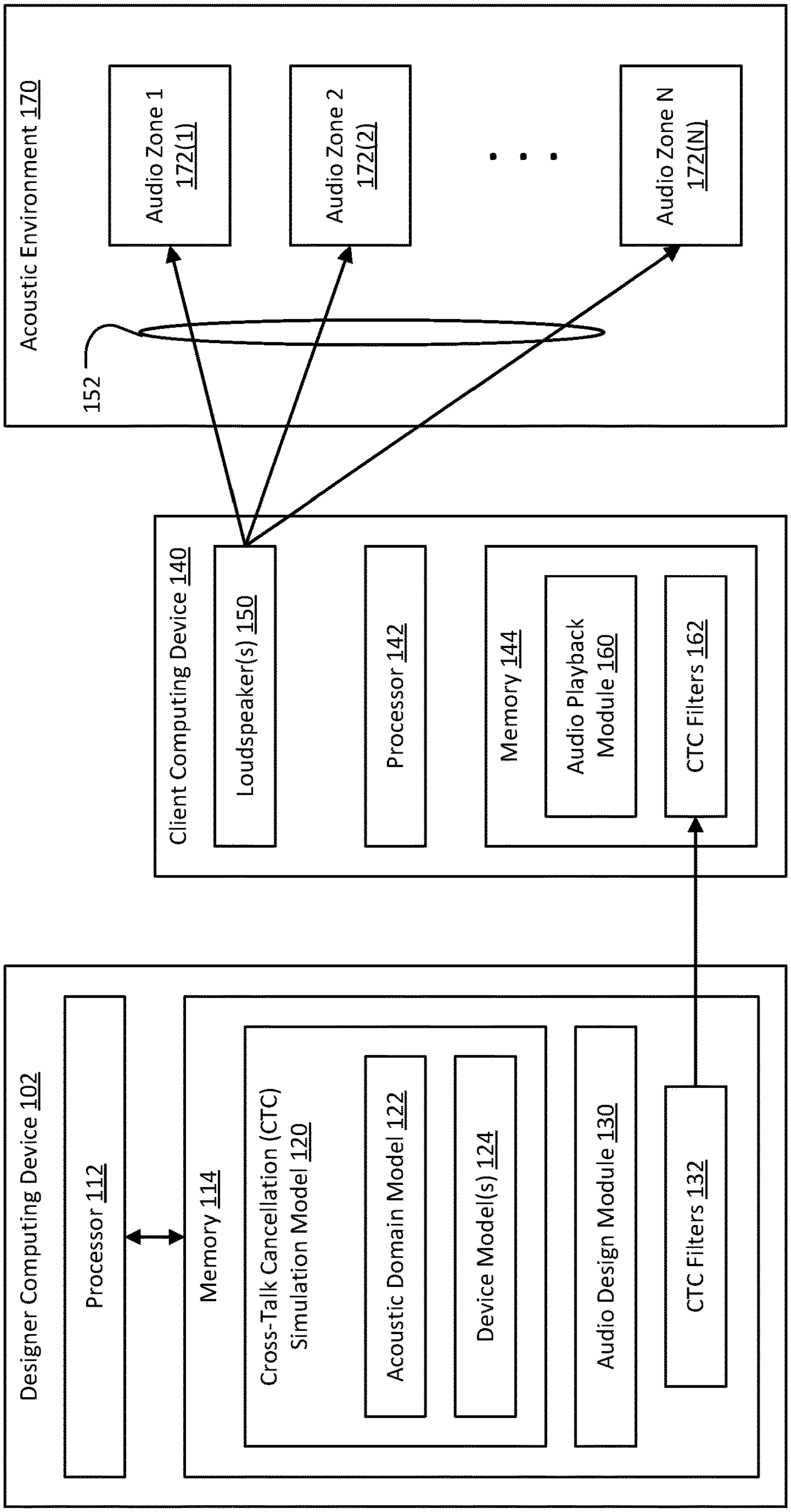
FIG. 1 is a schematic diagram illustrating an audio processing system in accordance with various embodiments.

FIG. 1 is a schematic diagram illustrating designer computing device 102 and a client computing device 140 for generating audio zones 172 within an acoustic environment. in accordance with various embodiments. As shown, and without limitation, the designer computing device 102 includes a processor 112 and a memory 114. The memory 114 includes, without limitation, an audio design module 130, one or more crosstalk cancellation (CTC) filters 132, and a CTC simulation model 120 that includes, without limitation, an acoustic domain model 122 and one or more optional device models 124. The client computing device 140 includes, without limitation, one or more loudspeakers 150, a processor 142, and a memory 144. The memory 144 includes, without limitation, an audio playback module 160 and a set of CTC filters 162. The acoustic environment 170 includes, without limitation, a set of soundwaves 152 and a set of audio zones 172 (e.g., 170(1)-170(N)).

In operation, the designer computing device 102 executes the audio design module 130 to set up and operate the CTC simulation model 120. The CTC simulation model 120 uses one or more component models to simulate the operation of corresponding real-world objects and/or performance of physical phenomena in a physical environment. The component models include the acoustic domain model 122 that simulates soundwaves propagating in the virtual acoustic environment. The acoustic domain model 122 also includes a group of virtual microphones positioned in a virtual acoustic domain (corresponding to positions within the acoustic environment 170). In some embodiments, the component models also include one or more device models 124 that each simulate the operation of a virtual loudspeaker outputting an audio reproduction of an input signals. The audio design module 130 configures a set of parameters for the CTC simulation model 120 to simulate the acoustic environment 170 and soundwaves produced by the set of loudspeakers 150.

Upon setting up the CTC simulation model 120, the audio design module 130 generates and inputs test signals for the virtual loudspeakers to reproduce. The CTC simulation model 120 causes the virtual loudspeakers to reproduce the test signals as soundwaves that propagate through the virtual acoustic domain. The virtual microphones capture the sound pressure data (e.g., frequency responses) at various positions within the virtual acoustic domain. The CTC simulation model 120 processes the sound pressure data and determines transfer functions that reflect the characteristics of the soundwaves at positions within the acoustic domain. The CTC simulation model 120 builds a transfer function matrix (H) for the acoustic environment from the respective transfer functions and computes a CTC filter matrix (C) as an inverse or a pseudo-inverse of the transfer function matrix. The CTC filter matrix includes a set of frequency-domain-based CTC filters 132 for use by loudspeakers to provide effective crosstalk cancellation in configurations similar to those of the CTC simulation model 120. The audio design module 130 verifies the set of CTC filters included in the CTC filter matrix, converts the set of CTC filters into the time domain and stores the set of time-domain-based CTC filters 132 in the memory 114. The designer computing device 102 broadcasts the set of CTC filters 132 to one or more client computer devices 140, where a given client computing device 140 stores the set of CTC filters 132 locally (e.g., the set of CTC filters 162).

When the audio playback module 160 subsequently receives multiple input audio signals to reproduce for multiple audio zones 172 within the acoustic environment 170, the audio playback module 160 identifies the set of CTC filters 162 as applicable for the characteristics of the acoustic environment 170. The audio playback module 160 applies one or more of the CTC filters 162 to each of the input audio signals and transmits filtered audio signals to each of the set of loudspeakers 150. The set of loudspeakers 150 reproduces the filtered audio signals by generating a set of soundwaves 152 that propagate within the acoustic environment 170. A given audio zone 172 (e.g., the audio zone 172(2)) receives the set of soundwaves 152. The set of soundwaves 152 combines as a sound field within the given audio zone 172(2) to attenuate sounds corresponding to the input signals intended for different audio zones 172 (e.g., the audio zones 172(1), 172(N)). In this manner, listeners within the given audio zone 172(2) hear a reproduction of an input audio signal intended for the audio zone 172(2) with limited distortion in a manner that does not require specialized noise cancelling equipment, such as over-the-ear headphones.

The designer computing device 102 is a computing device that a designer uses to generate a set of CTC filters 132. The designer computing device 102 generates and transmits the CTC filters 132 for storage by one or more client computing devices 140 as one of a group of locally stored sets of CTC filters 162 (e.g., CTC filters 162(1), 162(2), etc.). In various embodiments, the designer computing device 102 communicates with the client computing device 140 directly or via a network (not shown) to update the client computing device 140 with the CTC filters 132. In various embodiments, the designer computing device 102 executes the audio design module 130 and/or the CTC simulation model 120 to generate the CTC filters 132. In some embodiments, the CTC simulation model 120 initially generates a set of CTC filters in the frequency domain. In such instances, the designer computing device 102 converts the CTC filters to the time domain and stores the time-domain-based CTC filters 132 in the memory 114.

The processor 112 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a system on a chip (SoC), or a CPU configured to operate in conjunction with a GPU. In general, the processor 112 can be any technically feasible hardware unit capable of processing data and/or executing software applications.

The memory 114 can include a random-access memory (RAM) module, a flash memory unit, or any other type of memory unit or combination thereof. The processor 112 is configured to read data from and write data to memory 114. In various embodiments, the memory 114 includes non-volatile memory, such as optical drives, magnetic drives, flash drives, or other storage. In some embodiments, separate data stores, such as an external device included in a network ("cloud storage") supplements the memory 114. The audio design module 130 within memory 114 can be executed by the processor 112 to implement the overall functionality of the designer computing device 102, including running simulations and solvers within the CTC simulation model 120 and, thus, to coordinate the operation of the designer computing device 102 as a whole. In various embodiments, an interconnect bus (not shown) connects the processor 112, the memory 114, and any other components of the designer computing device 102.

The audio design module 130 configures and inputs data into the CTC simulation model 120, as well as manages the CTC filters 132 generated by the CTC simulation model 120. In various embodiments, the processor 112 executes the audio design module 130 to configure parameters associated with the CTC simulation model 120 simulating operations within a virtual acoustic environment. The configured CTC simulation model 120 generates a set of CTC filters that amplify the active zone signal and attenuate the other zone signals within the acoustic domain of the virtual acoustic environment. In some embodiments, the audio design module 130 validates the CTC filters that were generated by the CTC simulation model 120 and converts the CTC filters from the frequency domain to the time domain. Additionally or alternatively, in some embodiments, the audio design module 130 transmits the set of CTC filters 132 to other devices (e.g., the client computing device 140) for use during audio playback and validate the CTC filters 132 upon receiving acknowledgement messages and/or validation messages from the other devices. For example, the audio design module 130 initially transmits the CTC filters 132 to a first client computing device 140(1) and validates the CTC filters 132 upon receiving a validation message from the first client computing device 140(1) acknowledging the accuracy of the CTC filters 132.

In various embodiments, the audio design module 130 is a graphical user interface (GUI) that enables users to visually position virtual audio zones, virtual microphones, and/or virtual loudspeakers within a virtual three-dimensional acoustic environment. In some embodiments, the audio design module 130 enables a designer to manually control and/or modify one or more parameters for the CTC simulation model 120. For example, the audio design module 130 adjusts the number of virtual audio zones that are included, the number and/or position(s) of one or more virtual loudspeakers, the dimensions and/or properties of the three-dimensional environment (e.g., shape of boundaries, amount of reverberation at the boundaries, etc.), and so forth. In some embodiments, the audio design module 130 reconfigures the CTC simulation model 120 with differing parameters to generate distinct sets of CTC filters. For example, the audio design module 130 uses a first set of parameters to configure the CTC simulation model 120 to a first configuration that includes three audio zones and eight loudspeakers. Upon acquiring a first set of CTC filters 132(1)-132(L) for the first configuration, the audio design module 130 reconfigures the CTC simulation model 120 to a second configuration that includes four audio zones and eight loudspeakers to generate a second set of CTC filters 132(L+1)-132(X). In various embodiments, the audio design module 130 broadcasts each set of CTC filters 132(1)-132(L), 132(L+1)-132(Z) that are selectable to filter audio input signals based on the characteristics of the actual acoustic environment (e.g., the acoustic environment 170 including three audio zones 172(1)-172(N) and eight loudspeakers 150(1)-150(8)).

The CTC simulation model 120 is a computer model that simulates operations and physics within a virtual acoustic environment, as well as the operation of one or more virtual devices in the virtual acoustic environment. In some embodiments, the CTC simulation model 120 is trained with measurement data of frequency responses recorded in a test acoustic environment. In some embodiments, the CTC simulation model 120 is a finite element analysis (FEA) tool that computes and/or generates software or virtual hardware based on the simulated operations within the virtual acoustic environment. For example, the CTC simulation model 120 generates frequency data, such as frequency domain representations of soundwaves propagating from virtual loudspeakers. In such instances, the CTC simulation model 120 computes transfer functions associated with the frequency data, such as a transfer function representing changes in the soundwaves at two positions within the virtual acoustic environment. In some embodiments, the audio design module 130 generates one or more test signals in the frequency domain as inputs for the CTC simulation model 120. Additionally or alternatively, the CTC simulation model 120 converts various signals into the frequency domain and determines characteristics for a set of CTC filters 132 based on analysis of signals and virtual measurements in the frequency domain. For example, the audio design module 130 down-samples and/or uses a fast Fourier transform to convert a time domain representation of an input audio signal into frequency data. In such instances, the frequency data is in complex format such that all sound energy in the input audio signal is conserved when input into the CTC simulation model 120.

In some embodiments, the CTC simulation model 120 includes one or more component models to simulate one or more portions of the virtual acoustic environment. In some embodiments, the component models include the acoustic domain model 122 that simulates soundwaves emanating from the virtual loudspeakers. Additionally or alternatively, the component models include one or more device models 124 that simulate the operation of the virtual loudspeakers converting an input audio signal into a soundwave. In some embodiments, the CTC simulation model 120 uses a subset of the component models to estimate sound pressure data for the entire virtual acoustic environment. For example, the CTC simulation model 120 computes a transfer function based on the sound pressure data in the acoustic domain model 122. A solver included in the CTC simulation model 120 uses the transfer function for the acoustic domain model 122 to estimate a transfer function for the virtual acoustic environment. Alternatively, in some embodiments, the solver of the CTC simulation model 120 combines two or models to simulate operations within the entire virtual acoustic environment. For example, the CTC simulation model 120 uses one or more device models 124 to simulate the virtual loudspeakers reproducing an input signal as a soundwave. In such instances, solver of the CTC simulation model 120 determines transfer functions of each of the respective device models 124 and combine the transfer functions of the device models 124 with the transfer function of the acoustic domain model 122 to determine an overall transfer function for the virtual acoustic environment. Upon computing a transfer function for the virtual acoustic environment, solver of the CTC simulation model 120 then computes a set of CTC filters 132 in the frequency domain as an inverse or a pseudo-inverse of the transfer function for the virtual acoustic environment.

The acoustic domain model 122 is a computer model that simulates operations and physical phenomena within one or more portions of the acoustic environment 170. In various embodiments, the acoustic domain model 122 simulates the propagation of soundwaves within at least a portion of the acoustic environment 170. In such instances, the CTC simulation model 120 includes virtual devices, such as virtual microphones, to acquire sound pressure data within the virtual acoustic domain. In various embodiments, a solver included in the CTC simulation model 120 uses information from the acoustic domain model 122 to determine how soundwaves of the simulation propagated through the virtual acoustic environment. For example, the acoustic domain model 122 includes multiple virtual microphones that measure virtual sound pressure data within the virtual acoustic environment. In such instances, the solver of the CTC simulation model 120 acquires the frequency responses included in the sound pressure data and computes a transform function between the separate locations based on the frequency responses measured by different virtual microphones. In some embodiments, the CTC simulation model 120 uses the transform function associated with the acoustic domain model 122 to estimate the transfer function for the entire virtual acoustic environment. In such instances, the CTC simulation model 120 computes the set of CTC filters 132 in the frequency domain as an inverse or pseudo-inverse of the transfer function of the acoustic domain model 122, where filtered signals are attenuated based on an accurate simulation of how virtual soundwaves travel through the virtual acoustic environment.

The device model(s) 124 simulates the operations of the loudspeakers 150 that provide the set of soundwaves 152 to the acoustic environment 170. In various embodiments, the CTC simulation model 120 uses the device models 124 to simulate the performance of several types of virtual loudspeakers that receive an input signal and reproduce the input signal as a virtual soundwave. In some embodiments, the device model 124 is a multi-physics model, such as an electric, electromagnetic, and solid mechanics domain model, which simulates multiple aspects of a given loudspeaker 150. For example, the device model 124 simulates simultaneous phenomena, such as electromagnetics and acoustics. In various embodiments, the solver of the CTC simulation model 120 computes a transfer function for the device model 124, where the transfer function represents a change in frequency between the input audio signal and output virtual soundwave. In such instances, the CTC simulation model 120 uses the transfer function of the device model 124 to estimate how the virtual loudspeaker modified the input audio signal, and the transfer function of the device model 124 with transfer functions of other device models 124 and/or the transfer function of the acoustic domain model 122. The solver of the CTC simulation model 120 uses the combined transfer functions to estimate a transfer function for the entire virtual acoustic environment and generates the CTC filters 132 as an inverse or pseudo-inverse of the transfer function for the entire virtual acoustic environment.

In some embodiments, the CTC simulation model 120 includes multiple device models 124. For example, the CTC simulation model 120 includes a first device model 124(1) that simulates the operation of a first type of loudspeaker (e.g., a tweeter) and a second device model 124(2) that simulates the operation of a second type of loudspeaker (e.g., a subwoofer). The CTC simulation model 120 determines separate transfer functions for each of the respective virtual loudspeakers using the respective device models 124(1), 124(2) and incorporates the separate transfer functions into a transfer function for the entire virtual acoustic environment. Additionally or alternatively, the CTC simulation model 120 incorporates multiple instances of the same device model 124. For example, the CTC simulation model 120 includes two additional device models 124(3)-124(4) that similarly represent the operation of a tweeter. In such instances, the CTC simulation model 120 uses each of the device models 124(1)-124(4) to simulate different virtual loudspeakers producing soundwaves that propagate through the virtual acoustic environment.

The crosstalk cancellation filters 132, 162 modify characteristics of input signals. The CTC filters 132 are usable by playback modules (e.g., the audio playback module 160) to apply to input audio signals to modify each of the respective input signals to generate filtered signals. When reproduced by the set of loudspeakers 150, the filtered input signals attenuate noise associated with crosstalk within the acoustic environment. In this manner, the set of CTC filters 132 collectively enables a set of loudspeakers (e.g., the loudspeakers 150) to reproduce multiple input audio signals simultaneously, where a listener hears an input audio signal that is desired at a target listening position while attenuating the input signal at all remaining target listening positions.

In various embodiments, a set of CTC filters 132 are included in a CTC filter matrix that are collectively an inverse or a pseudo-inverse of a matrix of transfer function of the acoustic environment 170, as shown by Equation 1:

$$[C]=[H]^{-1} \qquad \text{Equation 1}$$

Where H is the transfer function matrix and C is the CTC filter matrix. The CTC filters 132 collectively cause the loudspeakers 150 to generate a set of soundwaves 152 that are an inverse of the transfer function at a given position within an audio zone 172 (e.g., 170(1)). In various embodiments, the audio playback module 160 applies each CTC filter 132 in the CTC filter matrix to one or more input audio signals to create a set of filtered signals. The audio playback module 160 provides the filtered signals to the loudspeakers 150 for reproduction. Applying such an inverse to input signals intended for other audio zones (e.g., 170(2)-170(N)) minimizes distortion associated with a listener hearing the other input signals within the audio zone 172(1). In some embodiments, subgroups of the filtered signals are combined to generate a speaker specific filtered input signal for a given loudspeaker 150. In such instances, the loudspeakers 150 respectively reproduce the speaker specific filtered input signals as the set of soundwaves 152, and the soundwaves 152 combine within the acoustic environment 170.

In various embodiments, the set of CTC filters 132 modify input signals based on characteristics of the acoustic environment 170 or parameters specified for a corresponding virtual acoustic environment that the CTC simulation model 120 uses to generate the set of CTC filters 132. For example, the CTC simulation model 120 generates the set of CTC filters 132 as a function of the number of virtual loudspeakers and/or the number of audio zones that are included in the virtual acoustic environment. Additionally or alternatively, the audio playback module 160 analyzes the acoustic environment 170 and selects a specific set of CTC filters 162 based on the characteristics of the acoustic environment 170.

The client computing device 140 is a device that executes the audio playback module 160 and drives the loudspeakers 150 to generate the set of soundwaves 152. In various embodiments, one or more of the client computing device(s) 140 and/or the loudspeakers 150 are included in one or more devices, such as vehicle systems (e.g., cars, buses, vans, airplanes, boats, etc.), consumer products (e.g., portable speakers, gaming, gambling, etc. products), smart home devices (e.g., smart lighting systems, security systems, digital assistants, etc.), communications systems (e.g., conference call systems, video conferencing systems, speaker amplification systems, etc.), and so forth. In various embodiments, the client computing device 140 is located in various environments including, without limitation, indoor environments (e.g., vehicle, living room, conference room, conference hall, home office, etc.), and/or outdoor environments, (e.g., patio, rooftop, garden, etc.).

The processor 142 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processor 142 can be any technically feasible hardware unit capable of processing data and/or executing software applications. In some embodiments, the processor 142 could be a low-power processor. In such instances, the digital signal processor performs lightweight computations, including real-time processing of electrical signals to generate filtered audio signals.

The memory 144 can include a random-access memory (RAM) module, a flash memory unit, an EEPROM, or any other type of memory unit or combination thereof. The processor 142 is configured to read data from and write data to the memory 144. In various embodiments, the memory 144 includes non-volatile memory, such as optical drives, magnetic drives, flash drives, or other storage. In some embodiments, separate data stores, such as external data stores included in a network ("cloud storage") can supplement or constitute the memory 144. In some embodiments, the audio playback module 160 within the memory 144 is executed by the processor 142 to implement the overall functionality of the client computing device 140. In various embodiments, an interconnect bus (not shown) connects the processor 142, the memory 144, and any other components of the client computing device 140.

The audio playback module 160 drives the loudspeakers 150 to generate, at least in part, a sound field in the acoustic environment 170 using the set of soundwaves 152. In various embodiments, the audio playback module 160 selects a specific set of CTC filters 162 to provide a set of input audio signals to one or more audio zones 172. The audio playback module 160 uses the selected set of CTC filters 162 to generate a sound field for the audio zones 172 within the acoustic environment 170. For example, Table 1 lists example zoning configurations for two audio zones 172.

TABLE 1

| Two Audio Zone Configurations | | |
|---|---|---|
| Configuration | Audio Zone 1 | Audio Zone 2 |
| 1 | Play same audio content | |
| 2 | Play audio content 1 | Play audio content 2 |
| 3 | Play audio content | Silence |
| 4 | Silence | Play audio content |

In various embodiments, the audio playback module 160 processes multiple input audio signals provided by one or more audio sources using the selected set of CTC filters 162. The audio playback module 160 distributes the filtered audio signals (e.g., the speaker specific filtered audio signals) for reproduction by the loudspeakers 150. For example, the audio playback module 160 receives a set of input audio signals from one or more audio sources, such as one or more personal media players and/or one or more content providers connected via a network. In such instances, the audio playback module 160 processes the set of input audio signals received from the one or more audio sources using the selected set of CTC filters 162.

The acoustic environment 170 is a portion of a physical environment through which the soundwaves 152 produced by the loudspeakers 150 are propagated. In various embodiments, the acoustic environment 170 includes various properties, such as sound vibrations from other sources, reverberant barriers, and inaudible sounds. In some embodiments, the acoustic environment 170 is modeled by the CTC simulation model 120 as a soundscape that generates sounds audible to a listener. For example, the acoustic environment 170 is a three-dimensional representation of a portion of an open physical environment, such as grounds in a park, or an entire closed environment, such as an interior cabin of a vehicle. Based on the characteristics of the acoustic environment 170 being modeled, the CTC simulation model 120 simulates soundwaves propagating within a virtual acoustic environment corresponding to the acoustic environment 170. In some embodiments, the client computing device 140 and/or the loudspeakers 150 are within the acoustic environment 170.

The audio zones 172 (e.g., 172(1)-172(N)) include one or more target areas within the acoustic environment 170 that are to receive a target sound. The audio playback module 160 employs a set of CTC filters 162 that corresponds to the number of audio zones 172 included in the acoustic environment 170 and the number of loudspeakers 150 that provides the set of soundwaves 152 to the acoustic environment. Upon filtering the input signals using the applicable set of CTC filters 162, the loudspeakers 150 reproduce the filtered signals as the set of soundwaves 152. The set of soundwaves 152 combine within each of the respective audio zones 172 such that listeners within an audio zone 172 hears the input signal for the audio zone 172 while other input signals intended for other audio zones 172 are attenuated. For example, a listener in audio zone 1 172(1) clearly hears the input signal $s_1$ while the combined filtered signals attenuate the listener from hearing input signals $s_2$ to $s_N$, the input signals intended for audio zone 2 172(2) to audio zone N 172(N). In some embodiments, at least one of the audio zones 172 is a silent zone, where listeners within the audio zone 172 are to hear no audio. In such instances, the audio playback module 160 provides a canceling signal as an input signal for the audio zone corresponding to silence, causing the set of loudspeakers 150 to produce a silent audio zone 172.

Figure 2:
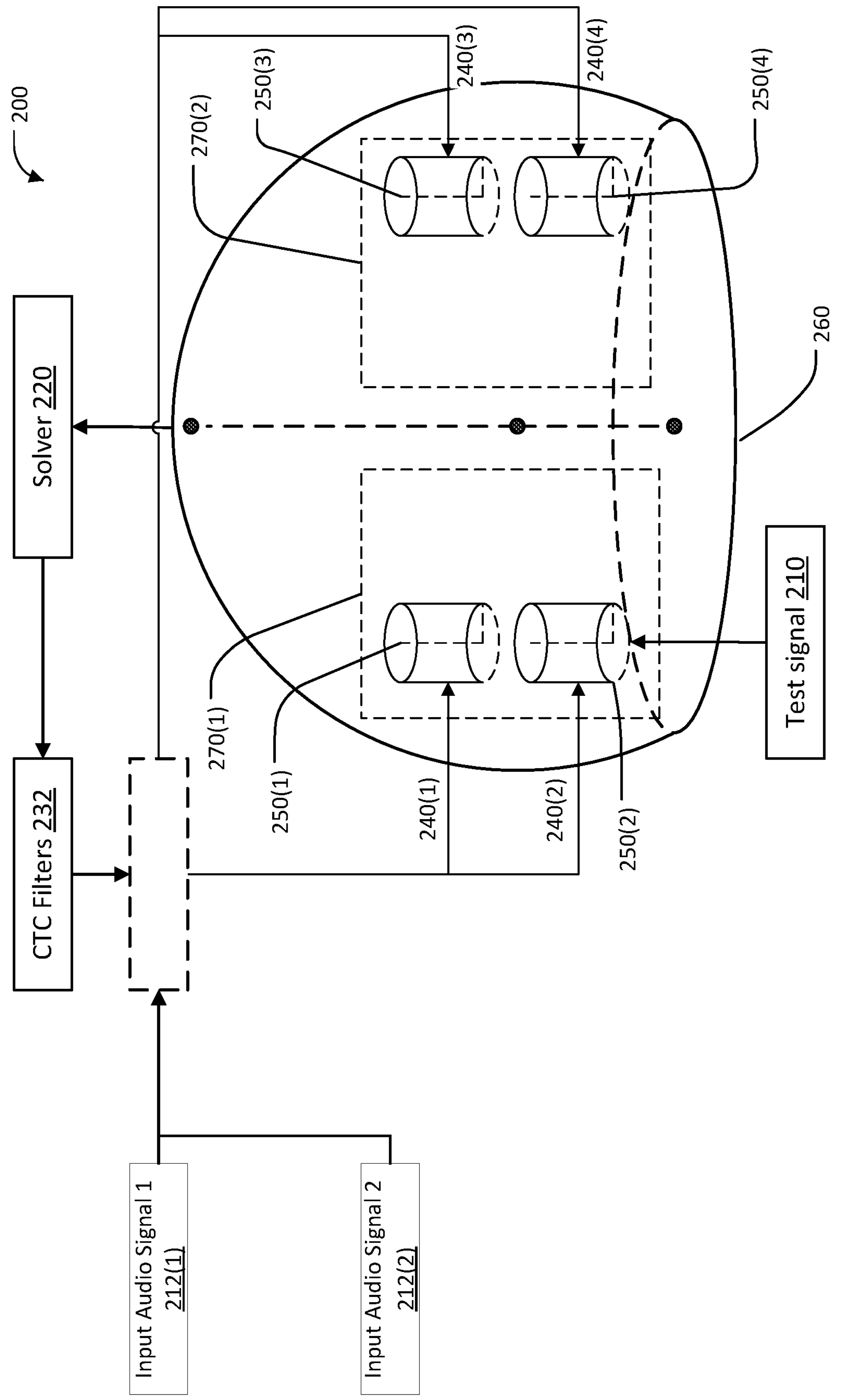
FIG. 2 illustrates an example virtual acoustic system modeled by the CTC simulation model of FIG. 1, according to various embodiments.

FIG. 2 illustrates an example virtual acoustic environment 200 modeled by the CTC simulation model 120 of FIG. 1, according to various embodiments. As shown, and without limitation, the virtual acoustic environment 200 includes frequency domain-based input signals 212, a solver 220, CTC filters 232, and a virtual acoustic environment 260. The virtual acoustic environment 260 includes, without limitations, a set of virtual loudspeakers 250, and a set of virtual audio zones 270.

In operation, the audio design module 130 specifies parameters for the virtual acoustic system, including the number and position of the virtual audio zones 270 and/or the number and position of the virtual loudspeakers 250. The CTC simulation model 120 generates the virtual acoustic environment 260 that includes the specified virtual loudspeakers 250 and the virtual audio zones 270. The CTC simulation model generates a frequency domain-based input signal 212 into a selected virtual loudspeaker 250 (e.g., 250(2)) and executes component simulations using the acoustic domain model 122 and/or the device model 124. The selected virtual loudspeaker 250(2) reproduces the test signal 210 as a virtual soundwave and virtual microphones (not shown) positioned within the virtual acoustic environment 260 record measurements of frequency responses to the virtual soundwave. The solver 220 analyzes the frequency responses from the respective virtual microphones to compute transfer functions between positions within the virtual acoustic environment 260. The CTC simulation model 120 then repeats the process for each speaker, successively inputting the test signal 210 into a different virtual loudspeaker 250 until the solver 220 computes transfer functions between positions within the virtual acoustic environment 260 when each of the virtual loudspeakers 250(1)-250(4) reproduce the test signal 210. The solver 220 builds a transfer function matrix for the virtual acoustic environment 260 based on the computed transfer functions. The solver 220 then generates the CTC filters 232 as components of a CTC filter matrix that is an inverse or a pseudo-inverse to transfer function matrix for the virtual acoustic environment 260.

In some embodiments, the CTC simulation model 120 also validates the computed CTC filters 232 using the virtual acoustic environment 260. In such instances, the CTC simulation model 120 receives and converts input audio signals to generate a set of frequency domain-based input signals 212. The CTC simulation model then modifies the frequency domain-based input signals 212 with the CTC filters 132 to generate filtered audio signals 240. Each of the respective virtual loudspeakers 250 receive a corresponding filtered audio signal 240 and reproduces the filtered audio signal 240 as a soundwave. The virtual microphones record frequency responses based on the sound field generated by the set of virtual loudspeakers 250. The solver 220 receives the frequency made by the virtual microphones to confirm that the computed CTC filters 232 create the respective virtual audio zones 270.

In various embodiments, the audio design module 130 controls the parameters for the virtual acoustic environment 260. For example, the audio design module 130 adjusts the number and position of virtual audio zones 270 that are included, the number and/or position(s) of one or more virtual loudspeakers 250, and/or the dimensions and/or properties of the three-dimensional environment (e.g., shape of boundaries, amount of reverberation at the boundaries, etc.) defining the virtual acoustic environment 260. For example, the audio design module 130 defines the virtual acoustic environment 260 as an interior enclosure with reverberant walls that includes two virtual audio zones 270(1)-270(2) and four virtual loudspeakers 250(1)-250(4), where each virtual audio zone 270 includes a pair of virtual loudspeakers 250. In various embodiments, the audio design module 130 specifies different parameters. For example, the audio design module 130 specifies an arrangement that includes eight virtual loudspeakers 250 for the two virtual audio zones 270 and/or any other combination of numbers of virtual loudspeakers 250 and numbers of audio zones 270.

In various embodiments, the parameters of the virtual acoustic environment 260 are based on a set of constraints associated with physical acoustic environments. For example, the audio design module 130 includes at least two virtual loudspeakers 250 for each respective virtual audio zone 270. In another example, the audio design module 130 limits each virtual loudspeaker 250 to receive a single speaker specific filtered audio signal 240. In such instances, the CTC simulation model 120 combines multiple filtered audio signals to generate the respective speaker specific filtered audio signals 240.

In some embodiments, the solver 220 performs finite element analysis or other mathematical modeling to solve equations associated with the CTC filters 232. In such instances, the solver 220 iteratively generates CTC filters 232 having specific frequency spectra characteristics and modifies the characteristics based on subsequent use during the validation process. In such instances, the solver 220 compares the virtual frequency responses recorded using the virtual microphones to predefined maximum thresholds, rejecting CTC filters 232 where crosstalk signals are above the threshold within a given virtual audio zone 270 (e.g., sounds corresponding to the input signal 212(2), intended for virtual audio zone 270(2), are above an audible threshold for the virtual audio zone 270(1)).

Figure 3:
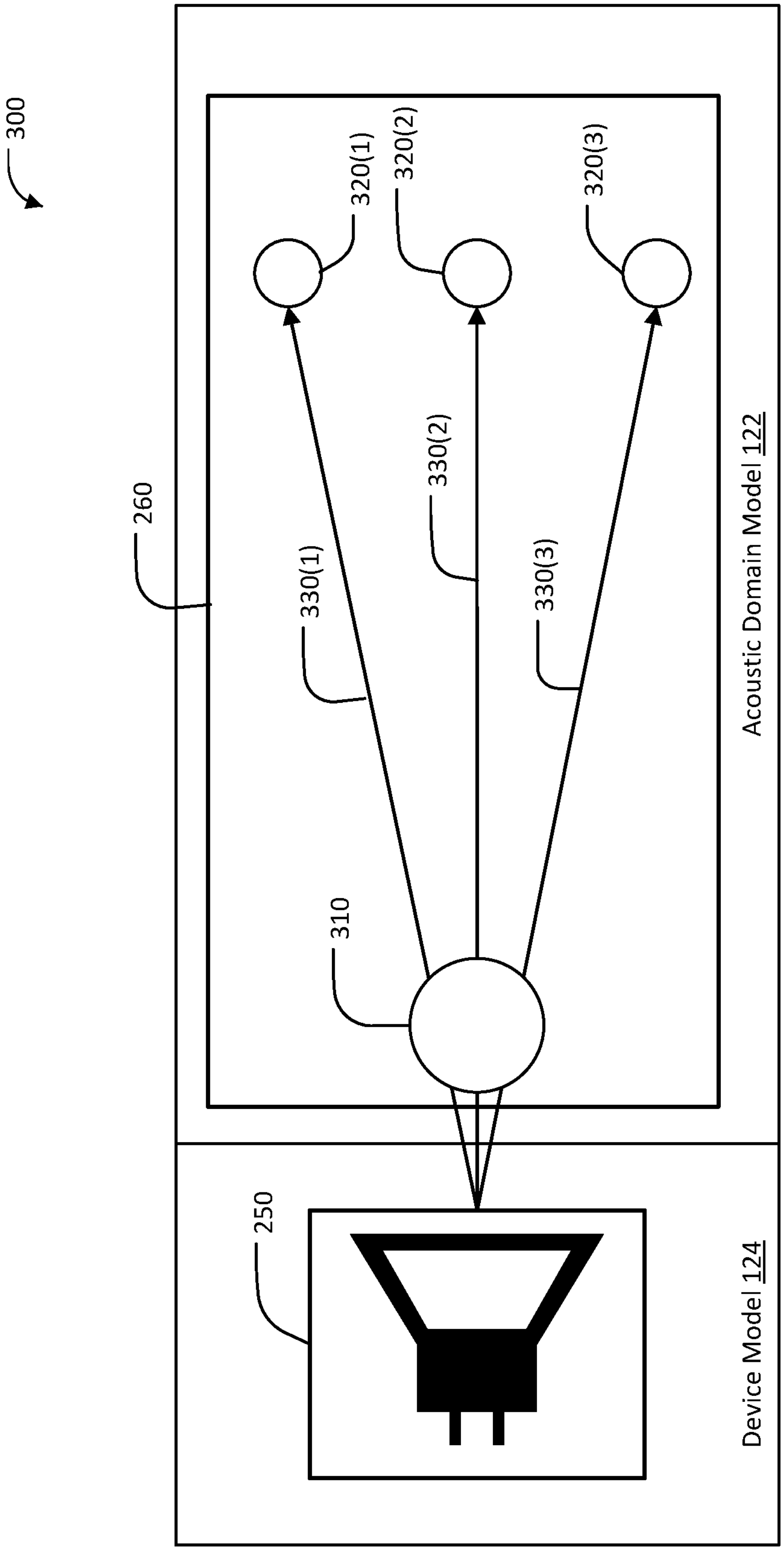
FIG. 3 illustrates multiple component models included the in the virtual acoustic environment of FIG. 2, according to various embodiments.

FIG. 3 illustrates multiple component models 122, 124 included in a virtual acoustic environment 300, according to various embodiments. As shown, and without limitation, the virtual acoustic environment 300 includes the acoustic domain model 122 and device model 124. The device model 124 includes, without limitation, a virtual loudspeaker 250. The acoustic domain model 122 includes, without limitation, a virtual acoustic environment 260. The virtual acoustic environment 260 includes, without limitation, a virtual reference microphone 310 and a set of virtual target microphones 320.

In operation, the CTC simulation model 120 inputs a test signal to the virtual loudspeaker 250. The CTC simulation model 120 executes the device model 124 to simulate the virtual loudspeaker 250 outputting an audio reproduction of the test signal. The virtual soundwaves 330 produced by the virtual loudspeaker 250 propagates through the virtual acoustic environment 260. The virtual reference microphone 310 records a frequency response based on the virtual soundwaves 330 at a position proximate to the virtual loudspeaker 250. The set of virtual target microphones 320 records frequency responses based on the virtual soundwaves 330 at various positions within the virtual acoustic environment 260.

In various embodiments, the virtual target microphones 320 measure frequency responses that include both direct soundwaves and reflected soundwaves in the steady state condition. For example, the virtual target microphone 320(2) acquires sound pressure data based on the direct virtual soundwave 330(2) and one or more reflected virtual soundwaves (not shown), where the characteristics of the reflected virtual soundwaves are modified based on the parameters of the virtual acoustic environment 260 (e.g., shape of boundaries, amount of reverberation at the boundaries, etc.).

The solver 220 receives the frequency responses recorded by the virtual microphones 310, 320 and computes transfer functions based on differences between the frequency responses; the computed transfer functions are included in a transfer matrix for the acoustic domain model 122. In some embodiments, the solver 220 computes a transfer function based on frequency data associated with the test signal and the virtual soundwaves 330; the computed transfer function is the transfer function for the device model 124. In some embodiments, the solver 220 uses the transfer function matrix of the acoustic domain model 122 as an estimated representation of the transfer function for the virtual acoustic environment. In various embodiments, the solver 220 determines the transfer function matrix for the acoustic domain model 122 based on the direct virtual soundwaves 330 and the reflected soundwaves, and therefore generates more accurate CTC filters 132, 232 for the reverberant acoustic environment. Further, the solver 220 generates CTC filters 132, 232 that are independent of the characteristics of the virtual loudspeakers 250 and functions for a wide range of loudspeaker types beyond the loudspeaker type associated with the device model 124. Alternatively, in some embodiments, the solver 220 combines the transfer function matrix of the acoustic domain model 122 and the transfer function of the device model 124 via convolution to determine the transfer function for the virtual acoustic environment.

Figure 4:
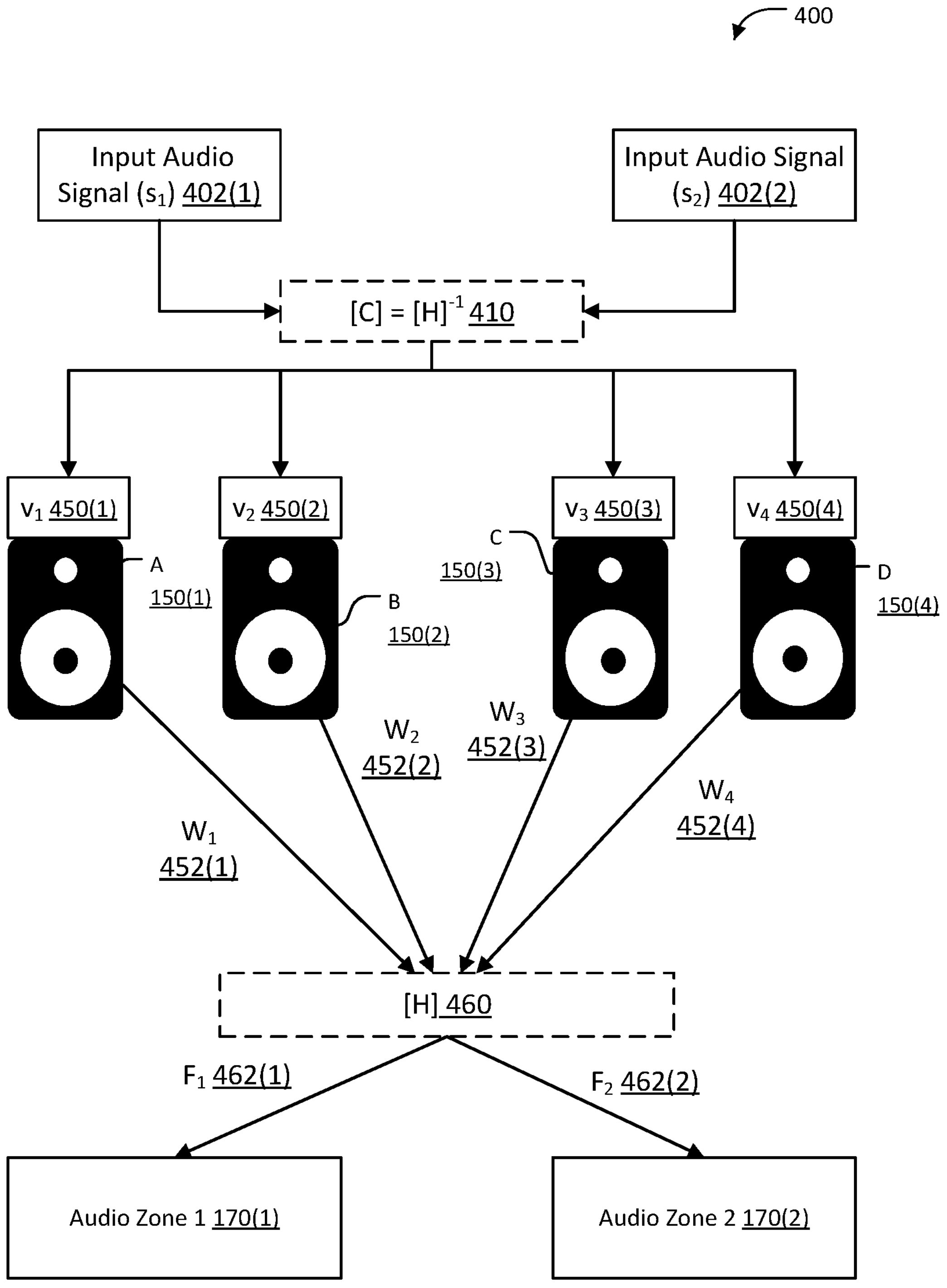
FIG. 4 is a schematic diagram illustrating a matrix of CTC filters for the acoustic environment modeled by the CTC simulation model of FIG. 2, according to various embodiments.

FIG. 4 is a schematic diagram illustrating a CTC filter matrix 410 for the acoustic environment 400 modeled by the CTC simulation model 120 of FIG. 2, according to various embodiments. As shown, and without limitation, the acoustic environment 400 includes a set of input audio signals 402, a CTC filter matrix 410, a set of speaker specific filtered signals 450, a set of loudspeakers 150, a set of soundwaves 452, an acoustic environment transfer function matrix 460, a set of sound fields 462, and a set of audio zones 172.

In operation, the solver 220 of the CTC simulation model 120 determines the acoustic environment transfer function matrix 460 based analyzing the virtual acoustic environment 260. The solver 220 generates the CTC filter matrix 410 as an inverse or a pseudo-inverse of the acoustic environment transfer function matrix 460. When the audio playback module 160 determines that the characteristics of the acoustic environment 400 are similar to the parameters of the virtual acoustic environment used to generate the CTC filter matrix 410, the audio playback module 160 selects the CTC filter matrix 410 for use to provide the input audio signals 402 to the audio zones 172. The audio playback module 160 applies the CTC filter matrix 410 to the input audio signals 402 to generate a set of speaker specific filtered signals 450.

The audio playback module 160 inputs the speaker specific filtered signals 450 to the respective loudspeakers 150. The loudspeakers 150 generate a set of soundwaves 452 that traverse through the acoustic environment 400. The acoustic environment transfer function matrix 460 models how the acoustic environment 170 modifies the set of soundwaves 452 to generate sound fields 462 for each respective audio zone 1. A listener in a given audio zone hears the sound field 462, where the sound field provides sound corresponding to the input audio signal (e.g., the input audio signal ($s_1$) 402(1)) intended for audio zone 1 170(1) and attenuates the input audio signal (e.g., the input audio signal ($s_2$) 402(2)) intended for audio zone 2 170(2).

In various embodiments, the solver 220 determines the acoustic environment transfer function matrix (H) 460 based at least on the acoustic domain matrix. The CTC simulation model 120 computes the acoustic domain matrix by using a test signal to iteratively drive a single virtual loudspeaker. The solver 220 acquires frequency responses of virtual microphones 310, 320 at various positions within the virtual acoustic environment 260 and determines one or more transfer functions in the acoustic domain based on the respective frequency responses.

For example, the CTC simulation model 120 determines the frequency responses $H_{A1}$ and $H_{A2}$ by driving a virtual loudspeaker 250(1) corresponding to the loudspeaker A 150(1) with a test signal. The virtual reference microphone 310 and virtual target microphones 320(1), 320(3) positioned in the respective virtual audio zones 270(1), 270(2) corresponding to the audio zones 172(1), 170(2) measure frequency responses of the virtual soundwaves 330. The solver 220 compares the respective frequency responses to determine the frequency response $H_{A1}$ based on the virtual loudspeaker A providing soundwaves to the first virtual audio zone 270(1) and the frequency response $H_{A2}$ based on the virtual loudspeaker A providing soundwaves to the second virtual audio zone 270(2). The solver 220 repeats this process for each virtual loudspeaker 250(2)-250(4) that correspond to loudspeaker B 150(2) through loudspeaker D 150(4) to generate the m×n acoustic domain matrix $H_D$, as shown in Equation 2:

$$H_D = \begin{bmatrix} H_{A1} & H_{B1} & H_{C1} & H_{D1} \\ H_{A2} & H_{B2} & H_{C2} & H_{D2} \end{bmatrix} \quad \text{Equation 2}$$

In some embodiments, the solver 220 uses the acoustic domain matrix as an estimate for the acoustic environment transfer function matrix (H) 460, as shown in Equation 3:

$$[H] = [H_D] \quad \text{Equation 3}$$

Alternatively, in some embodiments, the solver 220 determines a transfer function for the respective virtual loudspeakers 250. In such instances, the solver 220 combines the virtual loudspeaker transfer function $H_S$ with the acoustic domain transfer function to determine the acoustic environment transfer function matrix 460, as shown in Equation 4:

$$[H] = [H_D] * [H_S] \quad \text{Equation 4}$$

Upon determining the acoustic environment transfer function matrix 460, the solver 220 computes the CTC filter matrix (C) 410 as the inverse of the acoustic environment transfer function matrix (H) 460. In some embodiments, the acoustic environment transfer function matrix (H) 460 is not a square matrix. In such instances, the solver 220 computes the CTC filter matrix 410 as a n×m matrix that is a pseudo-inverse of the acoustic environment transfer function matrix 460, as shown in Equation 5:

$$[C] = [H]^{-1} = \begin{bmatrix} C_{A1} & C_{A2} \\ C_{B1} & C_{B2} \\ C_{C1} & C_{C2} \\ C_{D1} & C_{D2} \end{bmatrix} \quad \text{Equation 5}$$

The solver 220 then verifies the CTC filter matrix 410. In such instances, the designer computing device 102 converts the CTC filter matrix 410 to the time domain and distributes the frequency-domain-based CTC filter matrix 410 to one or more client computing devices 140. In some embodiments, the designer computing device 102 converts the CTC filter matrix 410 in the frequency domain to the time-domain based set of CTC filters 132 using a finite impulse response (FIR) filter setting with a Hilbert transform for the imaginary part, generating two filters. The designer computing device 102 then combines the two filters to generate the CTC filter matrix 410 in the time domain.

When the audio playback module 160 executing on the client computing device 140 determines to provide multiple input audio signals 402(1), 402(2) to the audio zones 172(1), 172(2), respectively, the audio playback module 160 retrieves the CTC filter matrix 410. In some embodiments, the client computing device 140 stores multiple CTC filter matrices 410. In such instances, the audio playback module 160 determines the characteristics of the acoustic environment 170 (e.g., number and position of loudspeakers 150, number and position of audio zones 172, etc.) to identify and select a specific CTC filter matrix 410 that corresponds to the characteristics of the acoustic environment 170.

When the audio playback module 160 receives the respective input audio signals 402, the audio playback module 160 applies one or more of the CTC filters 132 included in the CTC filter matrix 410 to generate a set of filtered audio signals. For example, the audio playback module 160 applies the $C_{A1}$ CTC filter to the first input audio signal $s_1$ 402(2) to generate the filtered audio signal $C_{A1} \otimes s_1$ (Note that $\otimes$ is a convolution operation in the time domain). The audio playback module 160 then combines filtered audio signals for each speaker to generate a set of speaker specific filtered signals (v) 450, as shown in Equations 6-9:

$$v_1 = C_{A1} \otimes s_1 + C_{A2} \otimes s_2 \quad \text{Equation 6}$$

$$v_2 = C_{B1} \otimes s_1 + C_{B2} \otimes s_2 \quad \text{Equation 7}$$

$$v_3 = C_{C1} \otimes s_1 + C_{C2} \otimes s_2 \quad \text{Equation 8}$$

$$v_4 = C_{D1} \otimes s_1 + C_{D2} \otimes s_2 \quad \text{Equation 9}$$

The audio playback module 160 transmits the set of speaker specific filtered signals 450(1)-450(4) to the respective loudspeakers 150(1)-150(4). The loudspeakers 150 reproduce the respective speaker specific filtered signals 450, producing the soundwaves (W) 452. The soundwaves 452 traverse within the acoustic environment 400. The soundwaves 452 combine within the acoustic environment 400 and the acoustic environment transfer function matrix 460 represents how the acoustic environment 400 modifies the soundwaves 452 to generate the combined soundwaves 452 that produce the sound fields (F) 462 for the respective audio zones 172. A listener in a given audio zone 172(1) hears the sound field $F_1$ 462(1) that is provided to the audio zone 172(1). The sound field F1 462(1) provides sound corresponding to the input audio signal $s_1$ 402(1)*t* intended for the audio zone 172(1) and attenuates sound corresponding to the input audio signal (e.g., the input audio signal ($s_2$) 402(2)) intended for another audio zone (e.g., the audio zone 172(2)).

In some embodiments, the listener may intend for the audio zone 172 to be silent. In such instances, the audio playback module 160 retrieves a null input audio signal 402 (e.g., a signal set to 0). The resultant sound field 462 creates a silent zone within the audio zone 172 specified by the listener.

Figure 5:
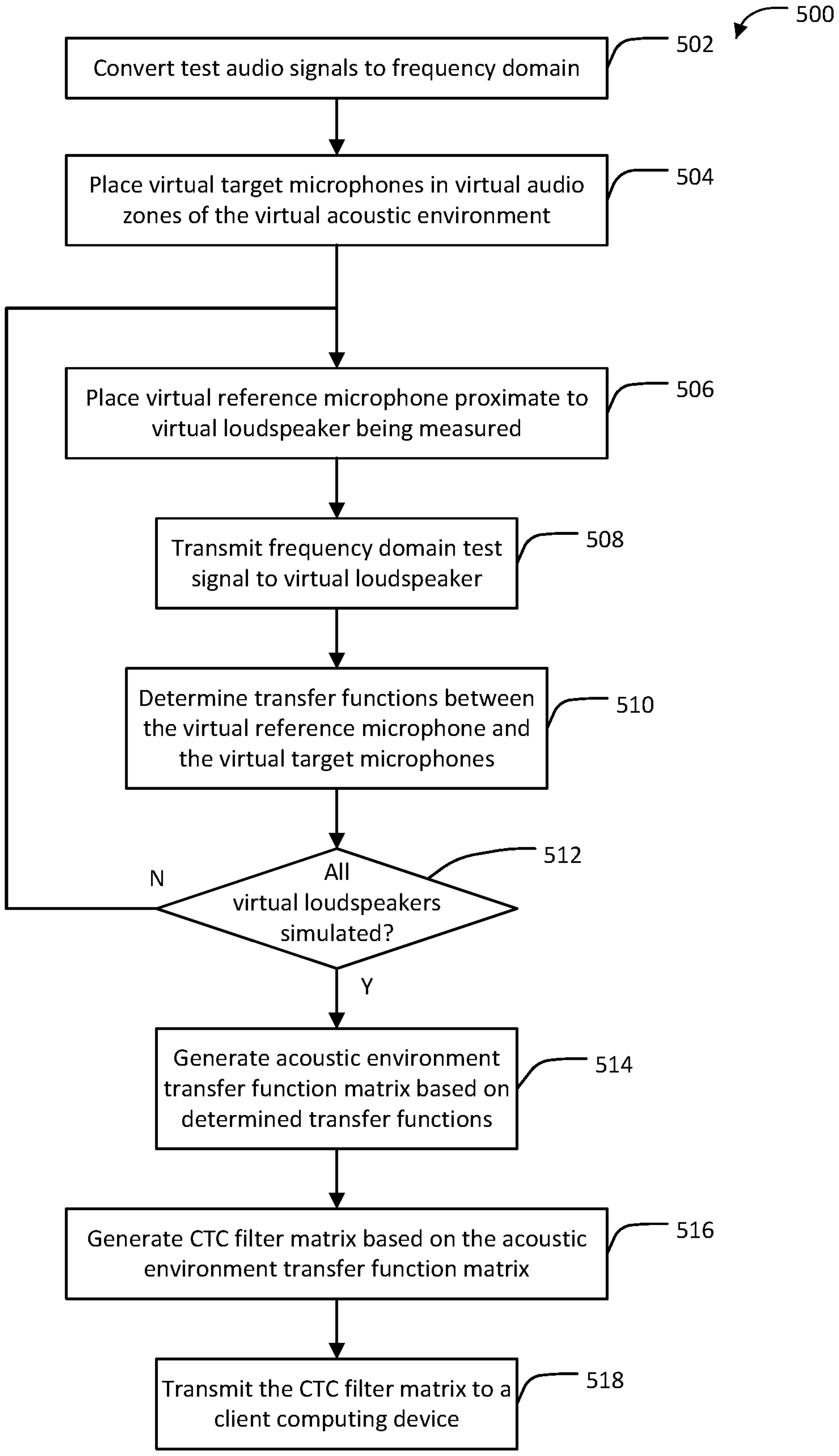
FIG. 5 sets forth a flow chart of method steps for generating a set of CTC filters for a set of loudspeakers using a CTC simulation model, according to various embodiments.

FIG. 5 sets forth a flow chart of method steps for generating a set of CTC filters for a set of loudspeakers using a CTC simulation model, according to various embodiments. Although the method steps are described with reference to the embodiments of FIGS. 1-4, persons skilled in the art will understand that any system configured to implement the method steps, in any order, falls within the scope of the present disclosure.

As shown, the method 500 begins at step 502, where the CTC simulation model 120 converts test audio signals to the frequency domain. In various embodiments, the CTC simulation model 120 uses a transform, such as a Fourier transform to transform a test audio signal from the time domain to the frequency domain. For example, the CTC simulation model uses an FFT to transform the test audio signal into one or more frequency components. The CTC simulation model 120 then uses the frequency domain test signal in further frequency analysis based on the virtual loudspeakers 250 reproducing the frequency domain test signal.

At step 504, the CTC simulation model 120 places virtual target microphones in virtual audio zones of the virtual acoustic environment. In various embodiments, the audio design module 130 specifies parameters for the CTC simulation model 120, where the parameters include the positions (e.g., location and orientation) of the virtual target microphones 320 within the virtual acoustic environment 260. The specified positions correspond to listening positions of one or more listeners within the audio zone 172 of the acoustic environment 170. In some embodiments, the parameters specify at least one position in each virtual audio zone 270. Alternatively, in some embodiments, the parameters specify two or more positions in a virtual audio zone 270. The CTC simulation model 120 processes the parameters and places a virtual target microphone 320 at each of the specified positions. The frequency responses measured by the virtual target microphones 320 at the specified positions indicate the sound pressure at the location indicating the sounds that a listener would hear at the specified position.

At step 506, the CTC simulation model 120 places a virtual reference microphone proximate to the virtual loudspeaker being measured. In various embodiments, the audio design module 130 specifies parameters for the CTC simulation model 120, where the parameters include the positions (e.g., location and orientation) of the virtual loudspeakers 250 within the virtual acoustic environment 260. The CTC simulation model 120 processes the parameters and places a virtual reference microphone 310 at a position proximate to the virtual loudspeaker 250. In such instances, the frequency response measured by the virtual reference microphone 310 indicates the sound pressure produced by the virtual loudspeaker 250 before the virtual soundwave 330 propagates through the virtual acoustic environment 260.

At step 508, the CTC simulation model 120 transmits the frequency domain test signal to the virtual loudspeaker. In various embodiments, the CTC simulation model 120 initiates simulation of a single virtual loudspeaker 250 (e.g., the virtual loudspeaker 250(1)) reproducing an input audio signal by transmitting the frequency domain test signal to the single virtual loudspeaker 250(1) and refraining from transmitting the frequency domain test signal to the other virtual loudspeakers 250(2)-250(N) within the virtual acoustic environment. In such instances, the single virtual loudspeaker 250(1) outputs a reproduction of the frequency domain test signal in the form of a virtual soundwave that propagates through the virtual acoustic environment 260.

At step 510, the CTC simulation model 120 determines transfer functions between the virtual reference microphone and the virtual target microphones. In various embodiments, the solver 220 included in the CTC simulation model 120 receives sound pressure data from the virtual reference microphones 310 and the virtual target microphones 320, where the microphones 310 acquired sound pressure data associated with the virtual loudspeaker outputting the virtual soundwave. The solver 220 compares the sound pressure data for a given virtual target microphone 320 relative to the virtual reference microphone 310 to determine a transfer function for a given virtual target microphone 320. In some embodiments, the virtual acoustic environment 260 includes two or more virtual target microphones 320. In such instances, the solver 220 computes a separate transfer function between each virtual target microphone 320 and the virtual reference microphone 310.

At step 512, the CTC simulation model 120 determines whether each virtual loudspeaker has been simulated. In various embodiments, the CTC simulation model 120 determines whether the CTC simulation model 120 has tested each virtual loudspeaker 250 in the virtual acoustic environment 260. When the CTC simulation model 120 determines that at least one virtual loudspeaker 250 has not been tested, the CTC simulation model 120 returns to step 506 to move the virtual reference microphone 310 to a position proximate to the virtual loudspeaker 250 being tested. Otherwise, the CTC simulation model 120 determines that each virtual loudspeaker 250 has been tested and proceeds to step 514.

At step 514, the CTC simulation model 120 generates an acoustic environment transfer function matrix based on the determined transfer functions. In various embodiments, the solver 220 of the CTC simulation model generates the acoustic environment transfer function matrix 460 based on the transfer functions determined for each virtual loudspeaker 250. In some embodiments, the solver 220 combines transfer functions based on multiple virtual target microphones 320. For example, the solver 220 first determines separate transfer functions between each virtual target microphone 320(1)-320(3) and the virtual reference microphone 310. The solver then combines each of the transfer functions to generate a transfer function for the virtual loudspeaker with respect to the group of virtual target microphones 320.

In some embodiments, the acoustic environment transfer function matrix 460 includes a separate transfer function for each virtual loudspeaker 250 with respect to each virtual audio zone 270. For example, when analyzing a virtual acoustic environment 260 that includes 3 audio zones and 6 virtual loudspeakers, the solver 220 generates an m×n matrix of 3×6 that includes each of the 18 respective transfer functions that the solver 220 determined.

At step 516, the CTC simulation model 120 generates a CTC filter matrix based on the acoustic environment transfer function matrix. In various embodiments, upon determining the acoustic environment transfer function matrix 460, the solver 220 of the CTC simulation model 120 determines a CTC filter matrix 410 based on the contents of the acoustic environment transfer function matrix 460. For example, the solver 220 determines the CTC filter matrix 410 as the inverse or pseudo-inverse of the acoustic environment transfer function matrix 460. Following the above example, the solver 220 generates a pseudo-inverse 6×3 matrix that includes 18 CTC filters 132, where each CTC filters 132 corresponds to a specific virtual loudspeaker providing sound to a specific audio zone (e.g., the CTC filter $C_{C3}$ being a CTC filter for the virtual loudspeaker C providing sound to audio zone 3).

At step 518, the designer computing device 102 transmits the CTC filter matrix to one or more client computing devices 140. In some embodiments, upon generating the CTC filter matrix 410, the solver 220 verifies the CTC filter matrix 410 and the designer computing device 102 converts the CTC filter matrix 410 to the time domain. The designer computing device 102 then distributes the time-domain-based CTC filter matrix 410 to one or more client computing devices 140 for use during playback. The CTC filter matrix 410 is usable by the audio playback module 160 to filter a set of input audio signals to generate soundwaves 152 within the acoustic environment 170.

In sum, an audio processing system sets parameters for a computer model to simulate the operation of a set of loudspeakers in an acoustic environment. The audio processing system modifies one or more parameters of a cross-talk cancellation (CTC) simulation model to analyze the operation of virtual loudspeakers providing virtual soundwaves in a virtual acoustic environment. The parameters include, among other things, the quantity and position of virtual audio zones that provide distinct virtual sound fields, the quantity and location of the virtual loudspeakers that provide the virtual soundwaves that form the virtual sound fields, and the presence and characteristics of reflecting surfaces in the virtual acoustic environment that provide reverberant virtual soundwaves. The CTC simulation model includes an acoustic domain model that simulates the virtual soundwaves propagating through the virtual acoustic environment from one or more virtual loudspeakers. The CTC simulation model also optionally includes one or more device models that simulate the virtual loudspeakers converting an input signal into the virtual soundwaves.

The CTC simulation model simulates the operation of each virtual loudspeaker included in the virtual acoustic environment by transmitting a test signal and measuring frequency responses in the virtual acoustic environment at different positions. The positions include a reference position proximate to the virtual loudspeaker being tested and one or more target positions in each of the respective audio zones. The CTC simulation model determines transfer functions between each of the respective target positions and the reference position and generates an acoustic domain transfer function matrix that includes each of the determined transfer functions. The CTC simulation model uses the acoustic domain transfer function matrix as an approximation for a transfer function for the entire virtual acoustic environment. The CTC simulation model then generates a CTC filter matrix that is an inverse matrix or a pseudo-inverse matrix to the acoustic domain transfer function matrix. The CTC filter matrix is converted from the frequency domain to the time domain and is usable by output devices to filter the input audio signals.

When a playback device receives separate input signals for playback to respective audio zones in an acoustic environment modeled by the CTC simulation model, playback device applies the CTC filter matrix to the input signals to generate filtered signals that are used to drive loudspeakers, which produce corresponding soundwaves. The soundwaves combine in the acoustic environment to generate separate sound fields for the audio zones. The set of soundwaves 152 combine within each of the respective audio zones 172 such that listeners within an audio zone 172 hears the input signal while other input signals intended for other audio zones 172 are attenuated.

At least one technical advantage of the disclosed techniques relative to the prior art is that, with the disclosed techniques, an audio processing system can more accurately generate multiple sound fields in a reverberant acoustic environment with lower distortion, increasing the auditory experience of the listener within the sound zone. In particular, by implementing a CTC simulation model that includes an acoustic domain model that accurately models sound waves propagating in a reverberant environment, the audio processing system determines more accurate transfer functions of between positions of listeners in the acoustic environment and the positions of the output devices providing the sound fields. As a result, the audio processing system generates more accurate estimates of frequency responses within the acoustic environment and more accurate crosstalk cancellation filters to lower distortion associated with other audio zones, increasing the auditory experience of a user within the audio zone. Further, the disclosed techniques reduce the time spent collecting physical measurements of frequency responses at locations within a physical testing environment that are otherwise needed to generate accurate crosstalk cancellation filters. These technical advantages provide one or more technological advancements over prior art approaches.

1. In various embodiments, a computer-implemented method for generating crosstalk cancellation (CTC) filters for a reverberant acoustic environment having multiple audio zones comprises determining, based on a CTC simulation model of an acoustic environment, a first set of frequency responses for respective positions proximate to one or more speakers located in the acoustic environment, and a second set of frequency responses for respective listening positions in the acoustic environment, generating, based on the first set of frequency responses and the second set of frequency responses, an acoustic environment transfer function matrix for the acoustic environment, and generating, based on the acoustic environment transfer function matrix, a set of CTC filters for a set of speakers in the acoustic environment.

2. The computer-implemented method of clause 1, further comprising determining a set of audio zones within the acoustic environment, where each audio zone in the set of audio zone includes at least one listening position, and the set of CTC filters is further based on the set of audio zones.

3. The computer-implemented method of clause 1 or 2, where the CTC filters, when used to filter an input audio signal, generate a selected signal corresponding to the input audio signal for a first audio zone in the set of audio zones, and a set of one or more cancellation signals, each of the set of one or more cancellation signals corresponding to an additional audio zone from the set of audio zones.

4. The computer-implemented method of any of clauses 1-3, where the set of audio zones includes at least one silent audio zone.

5. The computer-implemented method of any of clauses 1-4, further comprising transmitting the set of CTC filters to a client computing device, where the CTC filters are usable by the client computing device to filter a set of input audio signals to generate corresponding sound fields in the set of audio zones in the reverberant acoustic environment using the set of speakers.

6. The computer-implemented method of any of clauses 1-5, where the CTC simulation model includes a multi-physics model simulating operations of at least one speaker of the set of speakers reproducing an input audio signal.

7. The computer-implemented method of any of clauses 1-6, where the CTC simulation model includes an acoustic domain model including a virtual acoustic environment with one or more reflecting surfaces, the positions proximate to the one or more speakers, and the listening positions, and the acoustic environment transfer function matrix is based on an acoustic domain transfer function matrix associated with the first set of frequency responses and the second set of frequency responses.

8. The computer-implemented method of any of clauses 1-7, further comprising converting a set of time domain input signals into frequency domain signals, and inputting the frequency domain signals into the CTC simulation model to generate the first set of frequency responses and the second set of frequency responses.

9. The computer-implemented method of any of clauses 1-8, where the CTC simulation model is updated with measurement data of frequency responses recorded in a physical acoustic environment.

10. The computer-implemented method of any of clauses 1-9, where the set of CTC filters are included in a CTC filter matrix, and generating the set of CTC filters comprises inverting the acoustic environment transfer function matrix to generate the CTC filter matrix in a time domain and a frequency domain.

11. The computer-implemented method of any of clauses 1-10, where the set of CTC filters are included in a CTC filter matrix, and generating the set of CTC filters comprises computing a pseudo-inverse of the acoustic environment transfer function matrix to generate the CTC filter matrix.

12. The computer-implemented method of any of clauses 1-11, where determining first set of frequency responses and second set of frequency responses comprises, placing a virtual target microphone at each respective listening position, iteratively, for each of one or more virtual loudspeakers corresponding to the one or more speakers placing a virtual reference microphone proximate to a virtual loudspeaker, emitting a test signal using the virtual loudspeaker, acquiring a frequency response of the first set of frequency responses via the virtual reference microphone, and acquiring a subset of frequency responses of the second set of frequency responses via the virtual target microphones.

13. In various embodiments, one or more computer-readable media storing instructions for generating crosstalk cancellation (CTC) filters for a reverberant acoustic environment having multiple audio zones that, when executed by one or more processors, cause the one or more processors to perform the steps of determining, based on a CTC simulation model of an acoustic environment, a first set of frequency responses for respective positions proximate to one or more speakers located in the acoustic environment, and a second set of frequency responses for respective listening positions in the acoustic environment, generating, based on the first set of frequency responses and the second set of frequency responses, an acoustic environment transfer function matrix for the acoustic environment, and generating, based on the acoustic environment transfer function matrix, a set of CTC filters for a set of speakers in the acoustic environment.

14. The one or more computer-readable media of clause 13, further comprising instructions that, when executed by the one or more processors, cause the one or more processors to perform the step of transmitting the set of CTC filters to a client computing device, wherein the CTC filters are usable by the client computing device to filter a set of input audio signals to generate corresponding sound fields in the set of audio zones in the acoustic environment using the set of speakers.

15. The one or more computer-readable media of clause 13 or 14, where the CTC simulation model includes a multi-physics model simulating operations of at least one speaker of the set of speakers reproducing an input audio signal.

16. The one or more computer-readable media of any of clauses 13-15, where the CTC simulation model includes an acoustic domain model including a virtual acoustic environment with one or more reflecting surfaces, the positions proximate to the one or more speakers, and the listening positions, and the acoustic environment transfer function matrix is based on an acoustic domain transfer function matrix associated with the first set of frequency responses and the second set of frequency responses.

17. The one or more computer-readable media of any of clauses 13-16, further comprising converting a set of time domain input signals into frequency domain signals, and inputting the frequency domain signals into the CTC simulation model to generate the set of frequency responses.

18. The one or more computer-readable media of any of clauses 13-17, where the set of CTC filters are included in a CTC filter matrix, and generating the set of CTC filters comprises inverting the acoustic environment transfer function matrix to generate the CTC filter matrix, or computing a pseudo-inverse of the acoustic environment transfer function matrix to generate the CTC filter matrix.

19. The one or more computer-readable media of any of clauses 13-18, where determining first set of frequency responses and second set of frequency responses comprises, placing a virtual target microphone at each respective listening position, iteratively, for each of one or more virtual loudspeakers corresponding to the one or more speakers, placing a virtual reference microphone proximate to a virtual loudspeaker, emitting a test signal using the virtual loudspeaker, acquiring a frequency response of the first set of frequency responses via the virtual reference microphone, and acquiring a subset of frequency responses of the second set of frequency responses via the virtual target microphones.

20. In various embodiments, a system for generating crosstalk cancellation (CTC) filters for a reverberant acoustic environment having multiple audio zones, comprising a memory storing a for generating CTC simulation model of an acoustic environment, and a processor coupled to the memory that implements the CTC simulation model by performing the steps of determining, based on the CTC simulation model a first set of frequency responses for respective positions proximate to one or more speakers located in the acoustic environment, and a second set of frequency responses for respective listening positions in the acoustic environment, generating, based on the first set of frequency responses and the second set of frequency responses, an acoustic environment transfer function matrix for the acoustic environment, and generating, based on the acoustic environment transfer function matrix, a set of CTC filters for a set of speakers in the acoustic environment.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating crosstalk cancellation (CTC) filters for a reverberant acoustic environment having multiple audio zones, the method comprising:

determining, based on a CTC simulation model of an acoustic environment:

a first set of frequency responses for respective positions proximate to one or more speakers located in the acoustic environment, and a second set of frequency responses for respective listening positions in the acoustic environment;

generating, based on the first set of frequency responses and the second set of frequency responses, an acoustic environment transfer function matrix for the acoustic environment;

generating, based on the acoustic environment transfer function matrix, a set of CTC filters for a set of speakers in the acoustic environment; and transmitting the set of CTC filters to a client computing device, wherein the CTC filters are usable by the client computing device to filter a set of input audio signals to generate corresponding sound fields in the set of audio zones in the reverberant acoustic environment using the set of speakers.

2. The computer-implemented method of claim 1, further comprising determining a set of audio zones within the acoustic environment, wherein:

each audio zone in the set of audio zone includes at least one listening position; and the set of CTC filters is further based on the set of audio zones.

3. The computer-implemented method of claim 2, wherein the CTC filters, when used to filter an input audio signal, generate:

a selected signal corresponding to the input audio signal for a first audio zone in the set of audio zones; and a set of one or more cancellation signals, each of the set of one or more cancellation signals corresponding to an additional audio zone from the set of audio zones.

4. The computer-implemented method of claim 2, wherein the set of audio zones includes at least one silent audio zone.

5. The computer-implemented method of claim 1, wherein the CTC simulation model includes a multi-physics model simulating operations of at least one speaker of the set of speakers reproducing an input audio signal.

6. The computer-implemented method of claim 1, wherein:

the CTC simulation model includes an acoustic domain model including: a virtual acoustic environment with one or more reflecting surfaces, the positions proximate to the one or more speakers, and the listening positions, and the acoustic environment transfer function matrix is based on an acoustic domain transfer function matrix associated with the first set of frequency responses and the second set of frequency responses.

7. The computer-implemented method of claim 1, further comprising:

converting a set of time domain input signals into frequency domain signals; and inputting the frequency domain signals into the CTC simulation model to generate the first set of frequency responses and the second set of frequency responses.

8. The computer-implemented method of claim 1, wherein the CTC simulation model is updated with measurement data of frequency responses recorded in a physical acoustic environment.

9. The computer-implemented method of claim 1, wherein:

the set of CTC filters are included in a CTC filter matrix; and generating the set of CTC filters comprises inverting the acoustic environment transfer function matrix to generate the CTC filter matrix in a time domain and a frequency domain.

10. The computer-implemented method of claim 1, wherein:

the set of CTC filters are included in a CTC filter matrix; and generating the set of CTC filters comprises computing a pseudo-inverse of the acoustic environment transfer function matrix to generate the CTC filter matrix.

11. The computer-implemented method of claim 1, wherein determining first set of frequency responses and second set of frequency responses comprises:

placing a virtual target microphone at each respective listening position; and iteratively, for each of one or more virtual loudspeakers corresponding to the one or more speakers:

placing a virtual reference microphone proximate to a virtual loudspeaker;

emitting a test signal using the virtual loudspeaker;

acquiring a frequency response of the first set of frequency responses via the virtual reference microphone; and acquiring a subset of frequency responses of the second set of frequency responses via the virtual target microphones.

12. One or more non-transitory computer-readable media storing instructions for generating crosstalk cancellation (CTC) filters for a reverberant acoustic environment having multiple audio zones that, when executed by one or more processors, cause the one or more processors to perform the steps of:

determining, based on a CTC simulation model of an acoustic environment:

a first set of frequency responses for respective positions proximate to one or more speakers located in the acoustic environment, and a second set of frequency responses for respective listening positions in the acoustic environment;

generating, based on the first set of frequency responses and the second set of frequency responses, an acoustic environment transfer function matrix for the acoustic environment;

generating, based on the acoustic environment transfer function matrix, a set of CTC filters for a set of speakers in the acoustic environment; and transmitting the set of CTC filters to a client computing device, wherein the CTC filters are usable by the client computing device to filter a set of input audio signals to generate corresponding sound fields in the set of audio zones in the reverberant acoustic environment using the set of speakers.

13. The one or more non-transitory computer-readable media of claim 12, wherein the CTC simulation model includes a multi-physics model simulating operations of at least one speaker of the set of speakers reproducing an input audio signal.

14. The one or more non-transitory computer-readable media of claim 12, wherein:

the CTC simulation model includes an acoustic domain model including: a virtual acoustic environment with one or more reflecting surfaces, the positions proximate to the one or more speakers, and the listening positions; and the acoustic environment transfer function matrix is based on an acoustic domain transfer function matrix associated with the first set of frequency responses and the second set of frequency responses.

15. The one or more non-transitory computer-readable media of claim 13, further comprising:

converting a set of time domain input signals into frequency domain signals; and inputting the frequency domain signals into the CTC simulation model to generate the set of frequency responses.

16. The one or more non-transitory computer-readable media of claim 12, wherein:

the set of CTC filters are included in a CTC filter matrix; and generating the set of CTC filters comprises:

inverting the acoustic environment transfer function matrix to generate the CTC filter matrix, or computing a pseudo-inverse of the acoustic environment transfer function matrix to generate the CTC filter matrix.

17. The one or more non-transitory computer-readable media of claim 12, wherein determining first set of frequency responses and second set of frequency responses comprises:

placing a virtual target microphone at each respective listening position;

iteratively, for each of one or more virtual loudspeakers corresponding to the one or more speakers:

placing a virtual reference microphone proximate to a virtual loudspeaker;

emitting a test signal using the virtual loudspeaker;

acquiring a frequency response of the first set of frequency responses via the virtual reference microphone; and acquiring a subset of frequency responses of the second set of frequency responses via the virtual target microphones.

18. A system for generating crosstalk cancellation (CTC) filters for a reverberant acoustic environment having multiple audio zones, comprising:

a memory storing a for generating CTC simulation model of an acoustic environment; and a processor coupled to the memory that implements the CTC simulation model by performing the steps of:

determining, based on the CTC simulation model:

a first set of frequency responses for respective positions proximate to one or more speakers located in the acoustic environment, and a second set of frequency responses for respective listening positions in the acoustic environment;

generating, based on the first set of frequency responses and the second set of frequency responses, an acoustic environment transfer function matrix for the acoustic environment; and generating, based on the acoustic environment transfer function matrix, a set of CTC filters for a set of speakers in the acoustic environment; and transmitting the set of CTC filters to a client computing device, wherein the CTC filters are usable by the client computing device to filter a set of input audio signals to generate corresponding sound fields in the set of audio zones in the reverberant acoustic environment using the set of speakers.

* * * * *